United States Patent
Tamai et al.

[11] Patent Number: 5,995,191
[45] Date of Patent: *Nov. 30, 1999

[54] METHOD FOR MANUFACTURING A LIQUID CRYSTAL DISPLAY ELEMENT USING LIGHT-SHIELDING FILMS TO FORM SPACERS

[75] Inventors: Kazuhiko Tamai; Mitsuhiro Koden, both of Kashiwa, Japan

[73] Assignees: Sharp Kabushiki Kaisha, Osaka, Japan; The Secretary of State of Defense in Her Britannic Majesty Government of the United Kingdom of Great Britain and Northern Ireland, Hants, United Kingdom

[ * ] Notice: This patent is subject to a terminal disclaimer.

[21] Appl. No.: 09/045,554

[22] Filed: Mar. 20, 1998

Related U.S. Application Data

[62] Division of application No. 08/743,838, Nov. 5, 1996, Pat. No. 5,793,457.

[30] Foreign Application Priority Data

Nov. 6, 1995 [JP] Japan ................................. 7-287684

[51] Int. Cl.⁶ .................. G02F 1/1333; G02F 1/1339; G02F 1/13
[52] U.S. Cl. .................. 349/156; 349/110; 349/172; 349/184; 349/84
[58] Field of Search .................. 349/156, 110, 349/183, 84; 430/20

[56] References Cited

U.S. PATENT DOCUMENTS

| | | |
|---|---|---|
| 4,763,995 | 8/1988 | Katagiri et al. .......................... 350/341 |
| 4,842,377 | 6/1989 | Nakanowatari .......................... 350/344 |
| 5,412,494 | 5/1995 | Ishiwata et al. .......................... 359/67 |
| 5,419,991 | 5/1995 | Segawa .................................... 430/20 |
| 5,583,675 | 12/1996 | Yamada et al. ........................... 349/84 |
| 5,644,371 | 7/1997 | Koden et al. ............................ 349/110 |
| 5,769,393 | 6/1998 | Kobayashi et al. ................. 252/299.01 |
| 5,793,457 | 8/1998 | Tamai et al. ............................ 349/110 |
| 5,828,434 | 10/1998 | Koden et al. ............................ 349/148 |
| 5,880,803 | 3/1999 | Tamai et al. ............................ 349/156 |

FOREIGN PATENT DOCUMENTS

| | | |
|---|---|---|
| 441809 | 7/1992 | European Pat. Off. . |
| 0568355 | 11/1993 | European Pat. Off. . |
| 441810 | 7/1992 | Japan . |
| 05188385 | 7/1993 | Japan . |
| 07152024 | 6/1995 | Japan . |

Primary Examiner—William L. Sikes
Assistant Examiner—Julie Ngo

[57] ABSTRACT

A method for manufacturing a liquid crystal display element is provided. A plurality of electrodes having a light-transmitting property are formed in a striped pattern on one surface of an insulating substrate having a light-transmitting property. Then, light-shielding films are formed in such a manner that the light-shielding films are formed adjacent to the edges of each electrode along the long sides thereof, or at least one portion of each light-shielding film is made to overlap each edge of the electrode along one of the long sides thereof. Successively, light is applied from the back-surface side of the insulating substrate by using the light-shielding films and a photomask as masks so that spacers are formed in a state where they are self-aligned with respect to the light-shielding films.

15 Claims, 10 Drawing Sheets

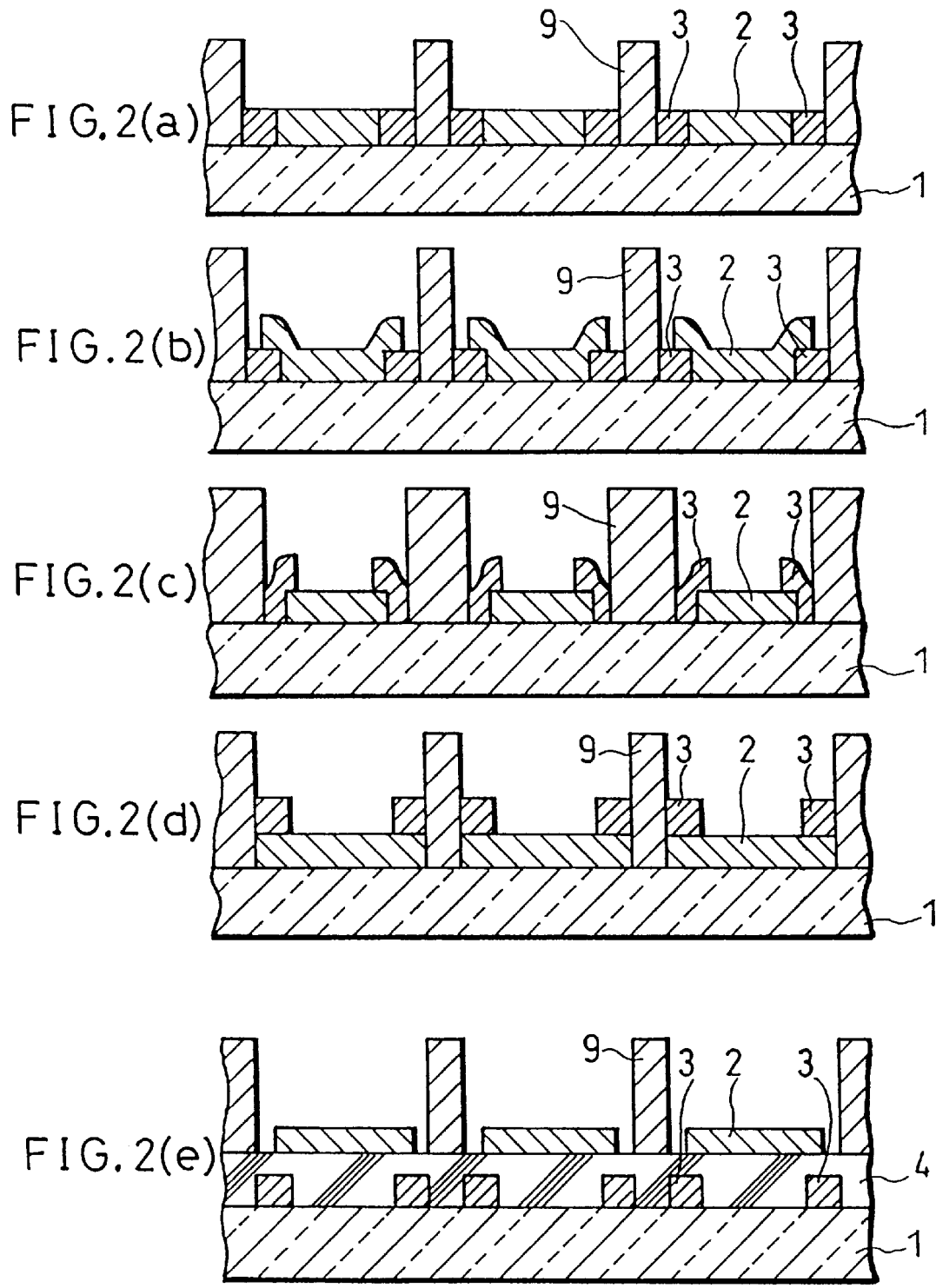

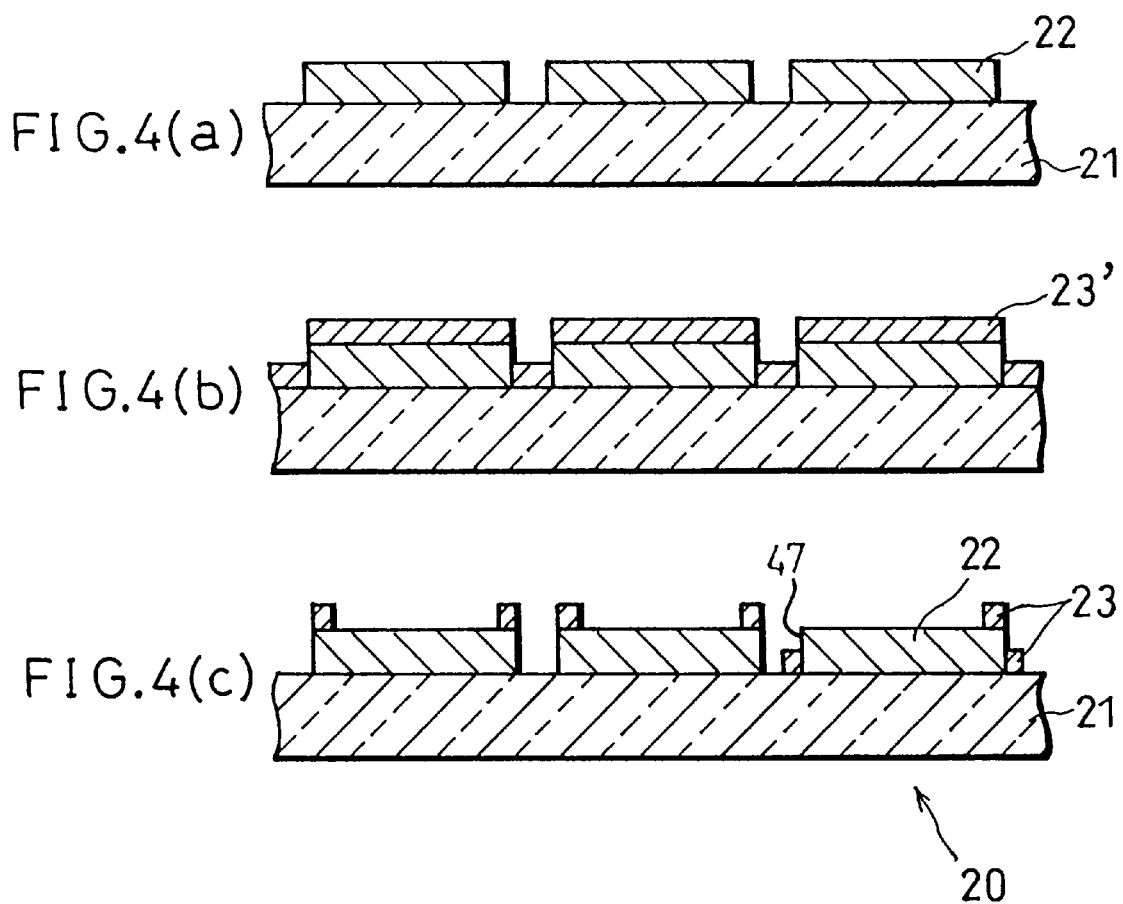

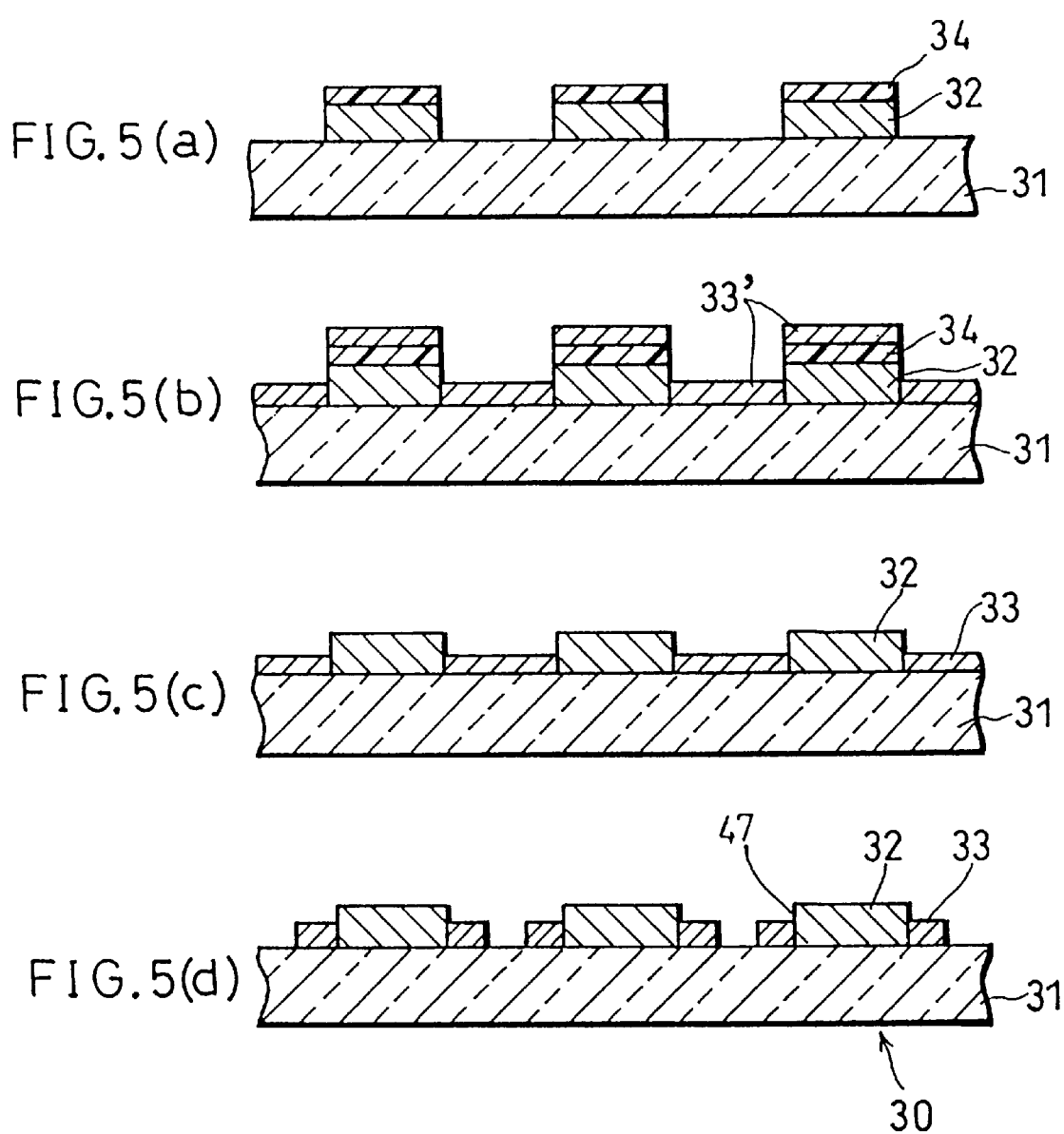

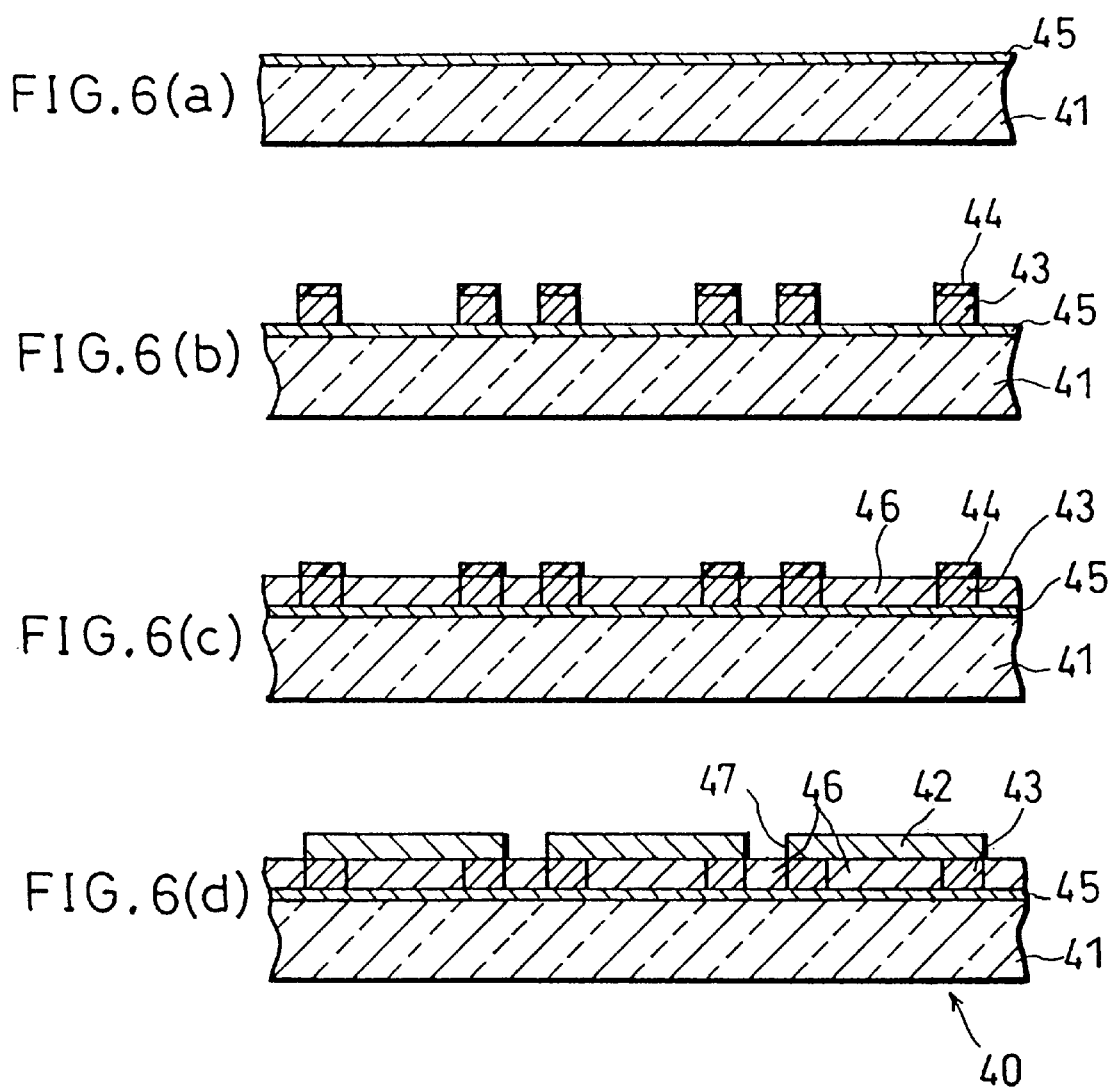

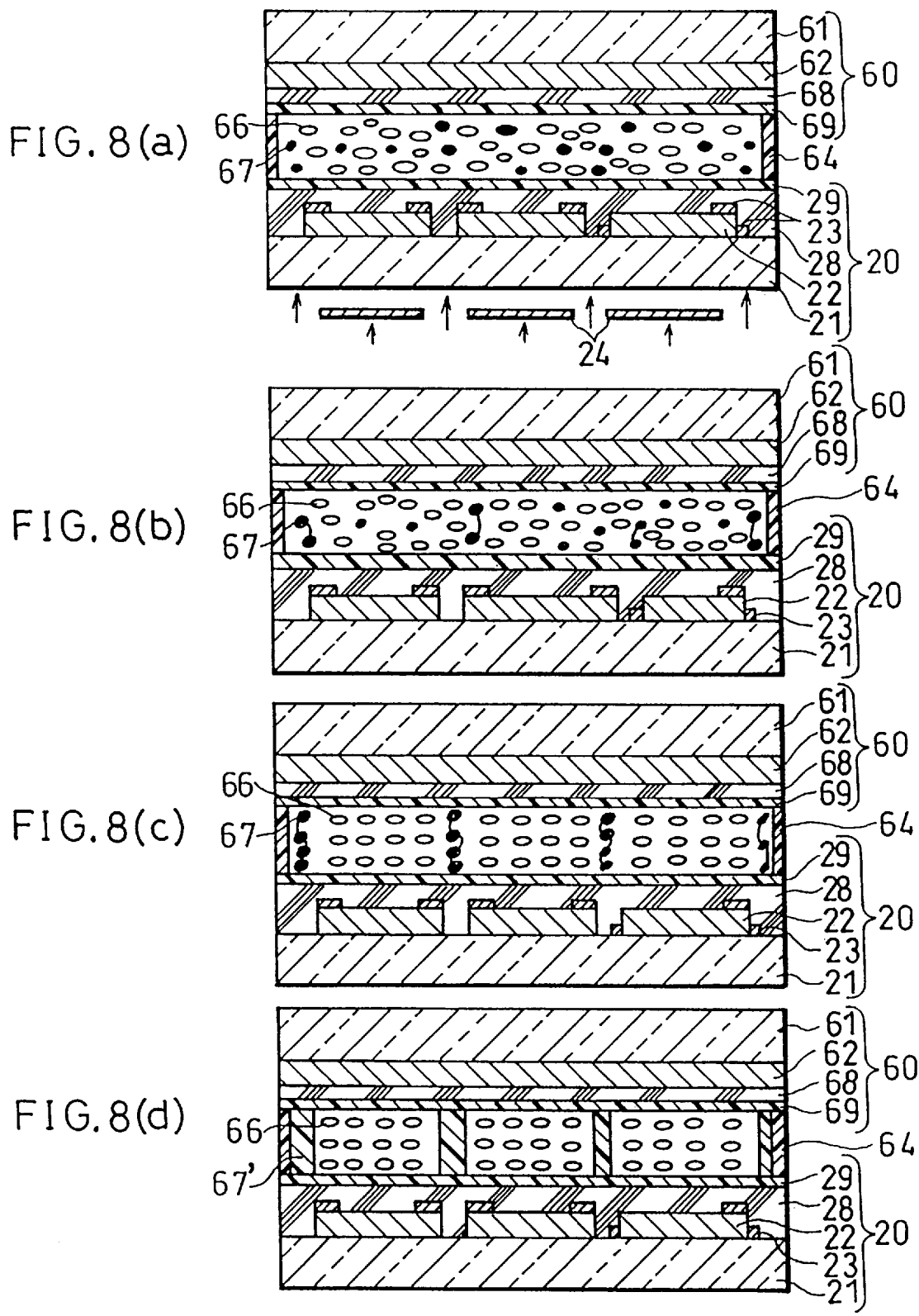

PRIOR ART

METHOD FOR MANUFACTURING A LIQUID CRYSTAL DISPLAY ELEMENT USING LIGHT-SHIELDING FILMS TO FORM SPACERS

This is a division of application Ser. No. 08/743,838, filed Nov. 5, 1996, now U.S. Pat No. 5,793,457.

FIELD OF THE INVENTION

The present invention relates to a liquid crystal display element which is constituted by sandwiching liquid crystal between a pair of substrates and a manufacturing method thereof, and more particularly concerns a liquid crystal display element which can achieve superior shock resistance as well as good display quality, and a manufacturing method that provides the liquid crystal display element by using easier manufacturing processes.

BACKGROUND OF THE INVENTION

Conventionally, liquid crystal display elements, which are made by bonding a paired substrates to each other with their electrode-bearing surfaces facing inside and by sealing liquid crystal into the gap between them, have been well known. In such liquid crystal displays, when the distance between the opposing substrates varies due to deformation of the substrates caused by external pressure or other adverse effects, changes in the threshold-voltage value of switching, shortcircuit in the electrodes between the opposing substrates, disturbance in the orientation of the liquid crystal molecules, etc. tend to occur, thereby making it impossible to provide good display images. For this reason, in order to keep the distance between the paired substrates constant, some methods for placing spacers between the substrates have been suggested; conventionally, either of the following two methods is commonly adopted: (1) a method for spraying spherical particles and (2) a method for forming pillars made of an organic or inorganic material.

Specific examples of method (1) include a dry method in which spherical fine particles, made of, for example, an organic resin, such as a polymer of divinylbenzenes, are dispersed in a gas flow of nitrogen and are sprayed on the substrates, and a method in which the spherical fine particles are mixed in an alcohol solution or other solutions and sprayed on the substrates in a mist state.

However, method (1) has the following problems: the first problem is that since the fine particles have a coagulating property whereby they coagulate with one another, it is difficult to spray them on the substrates in a uniform manner and consequently to achieve a uniform cell thickness. The second problem is that since it is difficult to control the adherence location of the fine particles, the particles, which have been unintentionally sprayed on pixel portions, tend to cause defects in the orientation, resulting in low display quality. Further, the third problem is that since the substrates are supported by the spherical fine particles that function as spacers only at their contact points, it is difficult to obtain sufficient strength against external pressure.

Moreover, method (2) more specifically refers to a method in which: an organic or inorganic film is formed with a predetermined thickness, a resist film is formed thereon, and the resist film is irradiated by ultraviolet lights using a photomask, thereby forming pillars that function as spacers. Here, instead of the resist film, for example, photosensitive organic resins, such as photosensitive polyimide or photosensitive acryl resins, can be adopted.

As described above, advantages of method (2) are that the pillars can be selectively formed on the outside of the pixels, and that the contact surfaces between the substrates and the pillars can be shaped into a desired pattern. Thus, method (2) is superior in the uniformity of the cell thickness, the strength against external pressure, and the display quality, as compared with method (1).

Recently, ferroelectric liquid crystal has been taken notice of as a prospective liquid crystal material since it has superior properties, such as having spontaneous polarization and providing high-speed response. However, the disadvantage of ferroelectric liquid crystal is that since it has a structure whose molecule-regularity is closer to that of a crystal, once the molecular orientation has been disturbed, it is difficult to return to its original state, that is, it is susceptible to shock. For this reason, in order to solve the above-mentioned inherent problem with ferroelectric liquid crystal, it is essential to provide a substrate construction that is superior in shock resistance. In order to provide a method for manufacturing such a liquid crystal display element, the method (2) is considered to be a more prospective candidate than the method (1).

However, in recent years, liquid crystal display elements have been required to meet further demands for display with high-resolution and large capacity; the required electrode gap on the substrate surfaces is as small as approximately 20 μm. Accordingly, the conventional method, in which insulating films are formed as spacers between the adjacent electrodes by exposing a photosensitive resin from the upper-surface side of the substrate using photomasks, has a problem in which extremely high definition is required in positioning the mask patterns and photomasks.

If the precision is low, gaps tend to be formed between electrodes 72 and an insulating film 73, for example, as illustrated in FIGS. 9(a) through 9(c). Here, in FIGS. 9(a) through 9(c), reference number 71 represents an insulating substrate, and reference number 74 represents a photomask. In such a case, a black matrix needs to be formed in order to prevent leakage of light from the gap between the electrodes 72 and the insulating film 73, or the aperture rate tends to be reduced due to the unwanted formation of the insulating film 73 on the electrode 72, as illustrated FIGS. 9(b) and 9(c), thereby resulting in other problems.

In order to solve the above-mentioned problems, for example, Japanese Examined Patent Publication No. 41810/1992 (Tokukouhei 4-41810) discloses a method for forming insulating films without using photomasks. In this method, as illustrated in FIG. 10(a), an organic resin film 83 of a photosensitive type is first formed in a manner so as to cover a transparent substrate 81 and a plurality of transparent electrodes 82 that have been formed thereon. Then, the organic resin film 83 is exposed by irradiating it with ultraviolet light from the rear-surface side of the transparent substrate 81. Here, filters are stacked on the transparent electrode 82, if necessary.

As a result, the transparent electrodes 82, or the transparent electrode 82 and the filters, function as photomasks, and when non-exposed portions of the organic resin film 83 is removed by an etching process, the remaining portions of the organic resin film 83 are formed in an adjacent manner to the transparent electrodes 82 without gaps, as illustrated in FIG. 10(b).

However, the problems with a construction manufactured by the above-mentioned method are that defects in the orientation tend to occur in the vicinity of the spacers since the organic resin film 83, which functions as spacers, is adjacent to the transparent electrodes 82, and that display nonuniformity tends to occur since differences are likely to occur in the switching characteristics of the liquid crystal between the vicinity of the spacers and the center portions of pixels. Moreover, in order to allow the transparent electrodes 82 to function as photomasks even in the case when filters are formed on the surfaces thereof, it is necessary to limit conditions upon exposure of light, such as the wavelength and intensity of light to be applied, to an extremely narrow range. This raises another problem in which the material of the organic resin film 83 is limited to a material that can be cured under the above-mentioned limited conditions.

In addition to the above-mentioned example, Japanese Examined Patent Publication No. 41809/1992 (Tokukouhei 4-41809) discloses another method in which: light-shielding films are first selectively formed on a transparent substrate, a light-transmitting organic resin film is next formed thereon, a positive-working photoresist film is further formed on the resin film, the photoresist is formed into a predetermined shape by irradiating it with light from the rear-surface side of the transparent substrate using the light-shielding films as a mask, and the resulting photoresist is used as masks so that the organic resin film, which is located beneath them, is formed into a predetermined shape; thus, spacers are formed. However, even in a construction manufactured by this method, since spacers are formed in an adjacent manner to the pixel display sections, the same problems as described above, that is, defects in the orientation in the vicinity of the spacers and the ununiformity in the switching characteristics, have been raised.

SUMMARY OF THE INVENTION

The objective of the present invention is to provide a liquid crystal display element which can achieve superior shock resistance as well as good display quality.

In order to achieve the above-mentioned objective, the first manufacturing method of a liquid crystal display element in accordance with the present invention has the steps of: (a) forming a plurality of electrodes having a light-transmitting property on one surface of an insulating substrate having a light-transmitting property in a striped pattern, as well as forming light-shielding films selectively with respect to the plurality of the electrodes so that the light-shielding films are formed adjacent to the edges of each electrode along the long sides thereof, or at least one portion of each light-shielding film is made to overlap each edge of the electrode along one of the long sides thereof; (b) forming a photosensitive resin film on one surface side of the insulating substrate on which the light-shielding films have been formed; (c) placing on the other surface side of the insulating substrate a light-regulating means for shielding from light at least portions of the electrodes that have not been shielded from light by the light-shielding films, as well as exposing photosensitive resin film located at portions other than the portions from which the light-regulating means and the light-shielding films have shielded light; and (d) removing non-exposed portions from the photosensitive resin film whereby the non-exposed portions of the photosensitive resin film are formed as spacers.

In the first manufacturing method, electrodes and light-shielding films are first formed on the surface of the insulating substrate having a light-transmitting property at step (a). In this case, the light-shielding films are arranged so that the light-shielding films are formed adjacent to the edges of each electrode along the long sides thereof, or so that at least one portion of each light-shielding film is made to overlap each edge of the electrode along one of the long sides thereof. Here, the light-shielding films may be formed with respect to all the electrodes, or may be formed with respect to some of the electrodes. At the next step (b), a photosensitive resin film, such as a negative-working photosensitive organic resin film, is formed on one side on which the electrodes and the light-shielding films have been made in such a manner. Then, at the succeeding step (c), a light-regulating means is placed on the other surface side of the insulating substrate so that one portion of the photosensitive resin film is selectively irradiated with light so as to be cured. Finally, at step (d), the resin at non-exposed portions is removed so that the remaining resin forms spacers.

Additionally, the light-regulating means, which is used at the above-mentioned step (c), is placed so as to shield from light at least portions at the electrodes from which light is not shielded by the light-shielding films; therefore, the light-regulating means is formed into any shape as long as it covers a region except for the portions at which the resin is allowed to finally remain as spacers in cooperation with the light-shielding films so as to shield the region from light. With this arrangement, spacers, each having a wall shape, can be selectively formed at portions at which none of the electrodes and the light-shielding films have been formed on the surface of the insulating substrate in its self-aligned state with respect to the light-shielding films. Thereafter, an opposing substrate is placed so as to face the insulating substrate, and these substrates are bonded to each other the wall-shaped spacers located in between, and then liquid crystal is injected into the gap between the substrates; thus a liquid crystal display element is manufactured. In this arrangement, since wall-shaped spacers that are shaped along the electrodes support the gap between the substrates, it becomes possible to provide a liquid crystal display element having high strength against external pressure.

Moreover, in accordance with the above-mentioned method, in the case when spacers are formed between a plurality of electrodes that are placed in a striped pattern with relatively fine pitches, the light-regulating means may be designed at step (c) into a shape so as to shield from light a width that is slightly wider than the width in the short-side direction of a portion of each electrode that bears no overlapping light-shielding films. In other words, it is not necessary to use high-precision photomasks or other members that provide a mask pattern that is identical to the pattern of spacers that are to be formed. That is, since it is only necessary to shield non-setting portions from light by using either the light-regulating means or the light-shielding films, more room is provided in the machining precision of a mask pattern of the photomask or in the positioning precision of the photomask. Thus, in a liquid crystal display element wherein electrodes are formed with fine pitches so as to provide high-resolution display, it becomes possible to easily form spacers accurately in narrow gaps between the electrodes. Consequently, it is possible to provide a liquid crystal display which can achieve high-resolution display as well as superior shock resistance.

Moreover, in the above-mentioned manufacturing method, the portions at which no spacer is to be formed are positively shielded from light by either the light-regulating means or the light-shielding films at Step (C). In other words, as compared with a conventional manufacturing method using, for example, color filters or other members formed on the electrode sections as photomasks, only fewer limitations are imposed with respect to conditions, such as a wavelength of light to be applied, or kinds of resin materials that are usable under the conditions.

Furthermore, in accordance with the above-mentioned manufacturing method, since spacers are formed in a state in which they are self-aligned with respect to the light-shielding films that have been formed on the periphery of each electrode, the light-shielding films are always interpolated between the electrode and the spacers, when viewed in the normal direction to the insulating substrate. In other words, in the case when the substrate on which the spacers have been formed by the above-mentioned method is bonded to another substrate and liquid crystal is sealed in the gap, even if nonuniformity in orientation of the liquid crystal occurs in the vicinity of the spacers, the vicinity of the spacers is covered with the light-shielding films. This makes it possible to provide a liquid crystal display element which can achieve uniform display.

As described above, the first manufacturing method makes it possible to easily manufacture a liquid crystal display element that can achieve superior shock resistance as well as good display.

In order to achieve the aforementioned objective, the second manufacturing method of a liquid crystal display element of the present invention has the steps of: (a) forming a plurality of electrodes having a light-transmitting property on one surface of an insulating substrate having a light-transmitting property in a striped pattern, as well as forming light-shielding films so that the light-shielding films are selectively formed adjacent to the edges of each electrode along the long sides thereof, or at least one portion of each light-shielding film is made to overlap each edge of the electrode along one of the long sides thereof; (b) forming an organic resin film having a light-transmitting property and a non-photosensitive property on one surface of the insulating substrate on which the light-shielding films have been formed; (c) forming a negative-working photoresist film on the organic resin film; (d) placing on the other surface side of the insulating substrate a light-regulating means for shielding from light at least portions of the electrodes that have not been shielded from light by the light-shielding films, as well as exposing the photoresist film so that its portions, from which neither the light-regulating means nor the light-shielding films have shielded light, are exposed; and (e) removing non-exposed portions of the photoresist film together with the organic resin film located beneath the non-exposed portions whereby the remaining organic resin film forms the spacers.

In accordance with the second manufacturing method, a light-transmitting organic resin can be adopted as the material of the spacers instead of the photosensitive resin that was used in the first manufacturing method. In other words, the portions, which have been shielded from light by either the light-regulating means or the light-shielding films at step (d) of the second manufacturing method, are removed as the non-exposed portions at step (e); thus, the remaining light-transmitting organic resin film forms spacers.

In the same manner as the first manufacturing method, the second manufacturing method makes it possible to accurately form fine spacers between electrodes that are formed with fine pitches, without the need for high photomask precision and high positioning precision. In other words, it is possible to easily manufacture a liquid crystal display element that is superior in shock resistance.

Furthermore, in the liquid crystal display element that is manufactured by the second manufacturing method, spacers are selectively formed at portions of the surface of the insulating substrate at which none of the electrodes and light-shielding films are formed in a state where they are self-aligned with respect to the light-shielding films. Thus, the light-shielding films are interpolated between the electrodes and spacers when viewed in the normal direction to the insulating substrate. In other words, in the case when the substrate on which the spacers have been formed by the above-mentioned method is bonded to another substrate and liquid crystal is sealed in the gap, even if, for example, nonuniformity in orientation of the liquid crystal occurs in the vicinity of the spacers, the nonuniformity can be covered with the light-shielding films. Consequently, it is possible to prevent nonuniformity in orientation from causing adverse effects on the display state, thereby making it possible to provide a liquid crystal display element which can achieve uniform display.

As described above, the second manufacturing method makes it possible to easily provide a liquid crystal display element which has a superior shock resistance and also achieves good display quality.

In order to achieve the aforementioned objective, the third manufacturing method of a liquid crystal display element of the present invention has the steps of: (a) forming a plurality of electrodes having a light-transmitting property on one surface of an insulating substrate having a light-transmitting property in a striped pattern, as well as forming light-shielding films so that the light-shielding films are formed adjacent to the edges of each electrode along the long sides thereof, or at least one portion of each light-shielding film is made to overlap each edge of the electrode along one of the long sides thereof; (b) placing an opposing substrate so as to face one surface of the insulating substrate on which the electrodes and the light-shielding films have been formed, and then injecting a mixture containing at least a precursor of photopolymerizable resin and a liquid crystal mixture in a gap between the insulating substrate and the opposing substrate; (c) placing a light-regulating means on the other surface side of the insulating substrate, and then applying light thereto so that the precursor of photopolymerizable resin is photopolymerized at its portions from which neither the light-regulating means nor the light-shielding films have shielded light, thereby forming spacers.

In the third manufacturing method, electrodes and light-shielding films are formed on the surface of the insulating substrate having a light-transmitting property at step (a). In this case, the light-shielding films are arranged so that the light-shielding films are formed adjacent to the edges of each electrode along the long sides thereof, or so that at least one portion of each light-shielding film is made to overlap each edge of the electrode along one of the long sides thereof. Here, the light-shielding films may be formed with respect to all the electrodes, or may be formed with respect to some of the electrodes. Next, an opposing substrate is placed so as to face one surface of the insulating substrate on which the electrodes and the light-shielding films have been formed, and a mixture containing at least a precursor of photopolymerizable resin and a liquid crystal mixture is injected into a gap between the substrates. Successively, light is applied thereto after placing a light-regulating means on the other surface of the insulating substrate, that is, on the back-surface side opposite to the opposing substrate. In this case, the light-regulating means is formed into any shape as long as at least either the light-regulating means or the light-shielding films cover a region except for the portions at which the spacers are to be formed. With this arrangement, spacers are formed in a state where they are self-aligned with respect to the light-shielding films between the electrodes.

Further, in the third manufacturing method, the spacers are formed after the liquid crystal has been injected between the substrates. Therefore, the pattern of the spacers need not be limited by the need for taking the injection efficiency of liquid crystal into consideration, and for example, it is possible to form spacers into a pattern so as to completely surround the peripheral areas of the pixels. In other words, since the spacer pattern is selectively determined so as to further increase the strength of the liquid crystal display element, it is possible to provide a liquid crystal display element which has further improved shock resistance.

Moreover, when the liquid crystal display element, which is manufactured by any of the first through third manufacturing methods, is designed to use ferroelectric liquid crystal as its liquid crystal, it is possible to provide a ferroelectric liquid crystal display element having superior shock resistance. Since the ferroelectric liquid crystal has superior properties such as fast response and bistability in molecular orientation, ferroelectric liquid crystal components are preferably used in high-resolution liquid crystal display elements of the passive matrix type that requires no active elements such as TFT. In contrast, the disadvantage of ferroelectric liquid crystal is that since it has a structure whose molecule-regularity is closer to that of a crystal, once the molecular orientation has been disturbed, it is difficult to return to its original state. However, the above-mentioned manufacturing method makes it possible to accurately form spacers even between electrodes that are formed with fine pitches; therefore, it is possible to increase the strength of the liquid crystal display element against external pressure. Consequently, the above-mentioned disadvantage with the ferroelectric liquid crystal has been eliminated and it becomes possible to provide a liquid crystal display element of the passive matrix type which can achieve superior shock resistance as well as high-resolution display.

For a fuller understanding of the nature and advantages of the invention, reference should be made to the ensuing detailed description taken in conjunction with the accompanying drawings.

BRIEF DESCRIPTION OF THE DRAWINGS

FIGS. 2(a) through 2(e) are cross-sectional views that show an example of a schematic construction of a substrate on which spacers are to be formed in the above-mentioned liquid crystal display element.

FIGS. 4(a) through 4(c) are cross-sectional views that show another example of processes in which electrodes and light-shielding films are formed on the surface of an insulating substrate.

FIGS. 5(a) through 5(d) are cross-sectional views that show still another example of processes in which electrodes and light-shielding films are formed on the surface of an insulating substrate.

FIGS. 6(a) through 6(d) are cross-sectional views that show still another example of processes in which electrodes and light-shielding films are formed on the surface of an insulating substrate.

FIGS. 8(a) through 8(d) are cross-sectional views that show a schematic construction of a liquid crystal display element in accordance with still another embodiment of the present invention and that are arranged in order of main manufacturing processes.

Figure 1A:
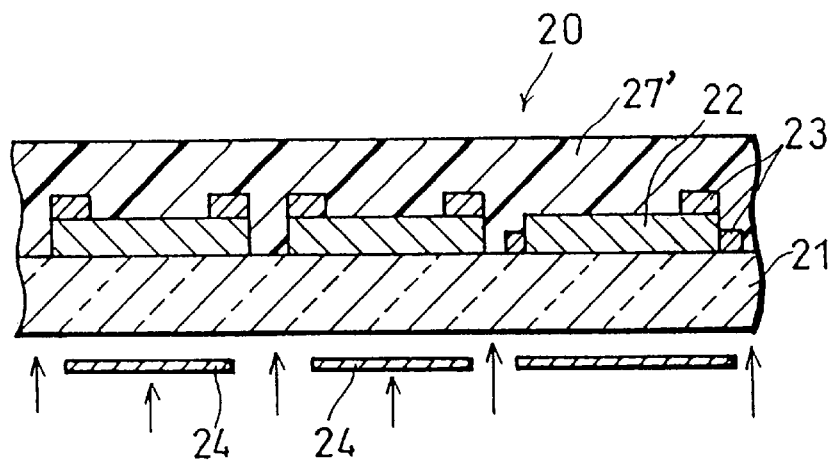
FIGS. 1(a) through 1(c) are cross-sectional views that show a schematic construction of a liquid crystal display element in accordance with one embodiment of the present invention and that are arranged in order of main manufacturing processes.

DESCRIPTION OF THE EMBODIMENTS
[Embodiment 1]

Referring to FIGS. 1 through 6, the following description will discuss one embodiment of the present invention.

A liquid crystal display element in accordance with the present embodiment is constituted by a pair of substrates and liquid crystal that is sandwiched in between. One of the substrates is constituted by an insulating substrate having a light-transmitting property one surface of which has a plurality of electrodes formed thereon with a striped pattern and by light-shielding films that are selectively formed with respect to the plural electrodes. The light-shielding films are formed in such a manner that when viewed in a direction parallel to the normal to the insulating substrate, the light-shielding films are formed adjacent to the edges of each electrode along the long sides thereof, or at least one portion of each light-shielding film is made to overlap each edge of the electrode along one of the long sides thereof.

FIGS. 2(a) through 2(e) show some examples of the electrodes and the light-shielding films that are formed on the insulating substrate. Here, each of FIGS. 2(a) through 2(e) is a cross-sectional view that is obtained by cutting the insulating substrate 1 on which the electrodes 2, the light-shielding films 3 and spacers 9 are formed in a direction parallel to the short sides of the electrodes 2. FIG. 2(a) shows a construction in which, when viewed in a direction parallel to the normal to the insulating substrate 1, the light-shielding films 3 are formed adjacent to the edges of each electrode 2 along the long sides thereof. FIGS. 2(b) through 2(e) respectively show constructions in which, when viewed in a direction parallel to the normal to the insulating substrate 1, the light-shielding films 3 are formed so that at least one portion of each light-shielding film 3 is made to overlap each edge of the electrode 2 along the long sides thereof. Further, FIG. 2(d) shows a construction in which the light-shielding films 3 are completely placed on the edges of each electrode 2.

Here, a substrate made of a transparent material, such as a glass substrate or a plastic substrate, is used as the insulating substrate 1. Electrodes made of a transparent material such as ITO are used as the electrodes 2. Opaque metal, such as Mo, Cr, Al, an organic resin and other material is used as the material of the light-shielding film 3. Moreover, an organic resin with which black dye is mixed so as to impart a light-shielding property thereto or other material is used as the material of the spacers 9.

In other words, in any of the constructions shown in FIGS. 2(a) through 2(e), when viewed from above in a direction parallel to the normal to the insulating substrate 1, the gap between the adjacent two electrodes 2 is shielded from light by the light-shielding films 3 and the spacers 9, and the spacer 9 and the electrode 2 are separated from each other by the light-shielding films 3 interpolated in between. Additionally, in FIGS. 2(b) and 2(c) or in FIG. (d), another film may be formed between the electrode 2 and the light-shielding films 3. For example, FIG. 2(e) illustrates an example analogous to the construction of FIG. 2(b) with a transparent film 4 formed between the electrodes 2 and the light-shielding films 3.

The following description will discuss examples of methods for forming the electrodes and the light-shielding films on the insulating substrate by reference to [Method 1] through [Method 4].

[Method 1]

Figure 3A:
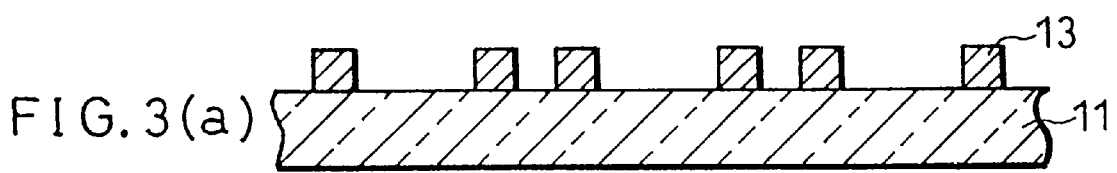
FIGS. 3(a) through 3(c) are cross-sectional views that show an example of processes in which electrodes and light-shielding films are formed on the surface of an insulating substrate.

First, an opaque metal film, made of Mo, Cr, Al or other metal, or an opaque organic resin film is formed on the surface of an insulating substrate 11, and this film is patterned by a photolithography process. Thus, as illustrated in FIG. 3(a), light-shielding films 13 having a desired pattern is formed on the insulating substrate 11.

Figure 3B:
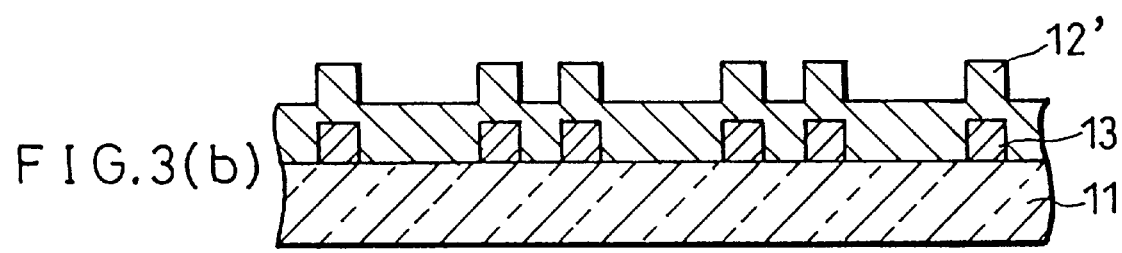

Next, as illustrated in FIG. 3(b), a thin film 12', made of ITO or other material, is formed on the surfaces of the insulating substrate 11 and the light-shielding films 13 formed thereon by the CVD method, sputtering method, or other method.

Figure 3C:
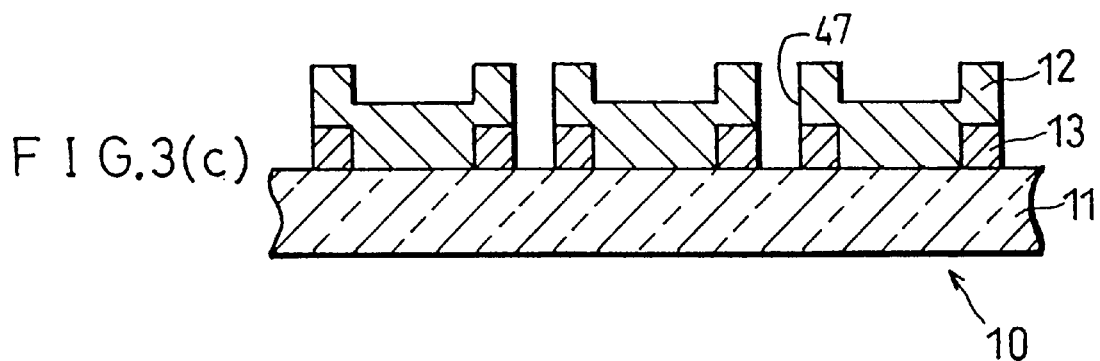

Then, this thin film 12' is patterned by a photolithography process. Thus, as illustrated in FIG. 3(c) a substrate 10, which has electrodes 12 with a desired pattern, is manufactured as illustrated in FIG. 3(c).

[Method 2]

First, a thin film, made of ITO or other material, is formed on the surface of an insulating substrate 21 by the CVD method, sputtering method, or other method. This thin film is patterned by a photolithography process so that electrodes 22 with a desired pattern is formed on the insulating substrate 21, as illustrated in FIG. 4(a).

Next, as illustrated in FIG. 4(b), a light-shielding thin film 23', made of an opaque metal such as Mo, Cr, Al or other metal, or an opaque organic resin or other material, is formed on the surfaces of the insulating substrate 21 and the electrodes 22 formed thereon.

Then, this thin film 23' is patterned by a photolithography process so that a substrate 20, which has light-shielding films 23 with a desired pattern, is manufactured as illustrated in FIG. 4(c).

[Method 3]

First, electrodes 32, which are the same as the electrodes 22 formed in Method 2, are formed on the surface of an insulating substrate 31; however, as illustrated 5(a), a resist film 34, which has been used upon patterning the electrodes 32, is left without being removed.

Next, as illustrated in FIG. 5(b), a light-shielding thin film 33', made of an opaque metal such as Mo, Cr, Al or other metal, or an opaque organic resin or other material, is formed on the surfaces of the insulating substrate 31 and the resist film 34.

Then, as illustrated in FIG. 5(c), after the light-shielding thin film 33' on the electrodes 32 have been removed by lifting the resist film 34 off, the light-shielding thin films 33', which have remained between the adjacent electrodes 32, is patterned by a photolithography process; thus, as illustrated in FIG. 5(d), a substrate 30, which has a construction wherein light-shielding films 33 are adjacent along both of the sides of the electrode 32, is manufactured.

[Method 4]

First, as illustrated in FIG. 6(a), an $SiO_2$ film 45 is formed on an insulating substrate 41 by the CVD method. Next, a light-shielding thin film, made of an opaque metal such as Mo, Cr, Al or other metal, or an opaque organic resin or other material, is formed on the surface of the $SiO_2$ film 45, and this is patterned by a photolithography process so that light-shielding films 43 are formed as illustrated in FIG. 6(b). Here, a resist film 44, which has been used in this process, is left without being removed.

Next, after an SiO layer 46 (intermediate layer) has been formed by the LPD (Liquid Phase Deposition) method as illustrated in FIG. 6(c), the resist film 44 is removed. Successively, an ITO film is formed on the surface of the SiO layer 46 by the CVD method or other method, and this ITO film is patterned by a photolithography process so that electrodes 42 are formed as illustrated in FIG. 6(d). The above-mentioned sequence of processes manufacture a substrate 40.

With each of the above-mentioned methods, the substrate 10, 20, 30 or 40, which has a construction wherein the light-shielding films are in such a manner that when viewed in a direction parallel to the normal to the insulating substrate, the light-shielding films are formed adjacent to the edges of each electrode along the long sides (denoted, e g., by reference numeral 47) thereof, or at least one portion of each light-shielding film is made to overlap each edge of the electrode along the long sides thereof, is manufactured.

Figure 1B:
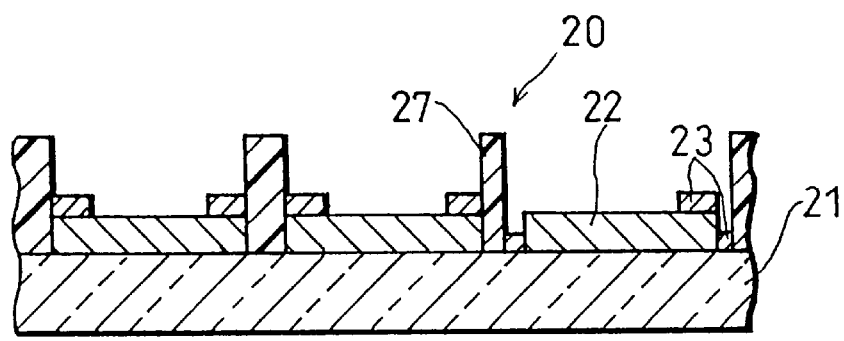
Figure 1C:
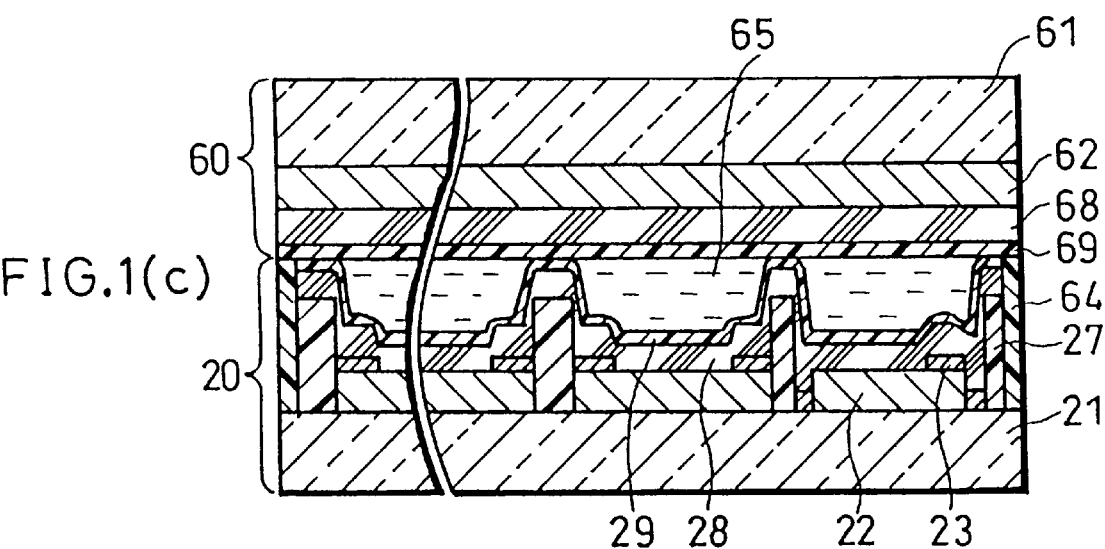

Next, referring to FIGS. 1(a) through 1(c), the following description will discuss processes for manufacturing a liquid crystal display element by forming spacers on the substrate and bonding it to another substrate (opposing substrate). Here, the processes for manufacturing a liquid crystal display are exemplified with reference to the substrate 20 that was manufactured by the aforementioned Method 2.

First, as illustrated in FIG. 1(a), a photosensitive organic resin film 27' (photosetting resin film), made of, for example, photosensitive polyimide or photosensitive acryl resin, is formed on the insulating substrate 21 of the substrate 20 by a method such as the spin coating method, the screen printing method or the roll coating method. Successively, a photomask 24 (light-regulating means) is positioned on the back-surface side of the insulating substrate 21, and light irradiation is applied thereto. Here, the photomask 24 is provided with light-shielding sections for covering at least portions of the electrodes 22 that have not shielded from light by the light-shielding films 23.

Thereafter, as illustrated in FIG. 1(b), when the resulting non-exposed portions have been removed by etching, spacers 27, which are made of the above-mentioned photosensitive organic resin 27' and which have a wall shape along the electrodes 22 in the lengthwise direction thereof, are formed at portions on the surface of the insulating substrate 21 that have neither the electrodes 22 nor the light-shielding films 23 formed thereon, in their self-aligned state with respect to the light-shielding films 23. With this formation of the wall-shaped spacers 27 between the respective electrodes 22, in the case when an opposing substrate, which will be described later, is bonded onto the spacers 27, it becomes possible to improve the substrate strength against external pressure and to provide a liquid crystal display element that is superior in shock resistance. In this embodiment, the spacers 27 were, for example, formed in all the gaps between the electrodes 22; however, the spacers may be formed selectively in some of the gaps between the electrodes 22, as long as a sufficient substrate strength is obtained.

Next, as illustrated in FIG. 1(c), an insulating film 28 is formed in a manner so as to cover the electrodes 22, the light-shielding films 23 and the spacers 27. The insulating film 28 is provided by forming an inorganic thin film made of, for example, $SiO_2$, $Al_2O_3$ or $SiN_x$, through a method, such as the vapor deposition method, the sputtering method or the CVD method. Alternatively, the insulating film 28 is provided by applying an organic thin film made of polyimide or other material through the spin coating method, the screen printing method, the roll coating method or other method, and by setting the organic thin film under predetermined setting conditions. Further, the formation of the organic thin film may be carried out by the vapor deposition method, the sputtering method or the LB (Langumuir-Blodgett) method.

As illustrated in FIG. 1(c), after the insulating film 28 has been formed, an alignment film 29 is formed so as to cover the insulating film 28. The alignment film 29 is formed by, for example, subjecting SiO to oblique evaporation. Alternatively, it is formed by applying an organic substance, such as nylon, polyimide or polyvinylalcohol, through the spin coating method, the screen printing method or the roll coating method, and by subjecting the organic substance to a rubbing process.

Through the above-mentioned processes, the substrate 20 in a liquid crystal display element, as illustrated in FIG. 1(c), is completely manufactured. Here, with respect to a substrate 60 having no spacers, that is, an opposing substrate, it is formed by successively stacking on an insulating substrate 61 electrodes 62, light-shielding films, not shown, an insulating film 68 and an alignment film 69 in the same manner as the aforementioned electrodes 22, light-shielding films 23, insulating film 28 and alignment film 29. Here, the insulating film 68 can be omitted depending on occasions. Moreover, although the light-shielding films on the substrate 60 are not illustrated in FIG. 1(c) since it does not appear in the cross section, it can be formed in the same manner as the light-shielding films 23 on the substrate 20.

Additionally, the insulating substrate 21 of the substrate 20 needs to have a light-transmitting property since spacers 27 are formed by irradiating it with light from the back side thereof, as described earlier. In contrast, the insulating substrate 61 of the substrate 60 which serves as an opposing substrate does not necessarily need to have a light-transmitting property.

Finally, the substrates 20 and 60, which have been manufactured through the above-mentioned processes, are bonded to each other by a seal agent 64, and then liquid crystal 65 is injected into a gap between the substrates 20 and 60; thus, a liquid crystal display element as illustrated in FIG. 1(c) is completed. Additionally, with respect to the insulating substrate 61, it may be constituted by a transparent substrate, or may be constituted by a non-transparent substrate, such as, for example, a silicon substrate.

As described above, in the liquid crystal display element of Embodiment 1, the spacers 27 are formed in their self-aligned state on the surface of the insulating substrate 21 of the substrate 20 at portions which have neither the electrodes 22 nor the light-shielding films 23 formed thereon, as clearly indicated by FIG. 1(b). Further, portions of the surfaces of the electrodes 22 in the vicinity of the spacers 27 are covered with the light-shielding films 23. Here, in a liquid crystal display element that has been made by bonding this substrate 20 to another substrate 60 with liquid crystal being sealed in the gap in between, display nonuniformity tends to occur due to disturbances in the orientation of liquid crystal molecules, changes in the switching characteristics, and other factors at the vicinity of the spacers 27. However, in the above-mentioned arrangement, since the vicinity of the spacers 27 is covered with the light-shielding films 23, it is possible to avoid degradation in display quality in the liquid crystal display element.

Moreover, the above-mentioned manufacturing method includes a process wherein after the electrodes 22 and the light-shielding films 23 have been formed, the photosensitive organic resin film 27' is selectively exposed by irradiating it with light from the back-surface side of the insulating substrate 21 after a photomask 24 has been positioned. In this process, the mask precision and positioning precision of the photomask 24 need not be set as high as those conventionally required, which is an advantage of the above-mentioned manufacturing method. In other words, in a conventional arrangement, it has been necessary to use a photomask that has a pattern identical to spacers to be formed, and especially when the electrodes are formed with fine pitches, high mask precision and high positioning precision have been required. However, in the above-mentioned photomask 24, it is only necessary to design its light-shielding portion to have a width that is slightly wider than the width of a portion of the electrode 22 that is not covered with the light-shielding film 23 and that is also smaller than the width of the electrode 22. Further, the above-mentioned method also makes it possible to provide a little more room for the positioning precision of the photomask 24. The resulting effect is an easier spacer-forming process.

Furthermore, since portions at which no spacers 27 are formed are positively shielded from light by the photomask 24 or the light-shielding films 23, only fewer limitations are imposed with respect to conditions, such as a wavelength of light to be applied, or kinds of resin materials that are usable under the conditions, as compared with a conventional manufacturing method using, for example, color filters or other members formed on the electrode sections as photomasks; this is another advantage of the method of the present embodiment.

Additionally, a ferroelectric liquid crystal may be preferably used as the liquid crystal 65 that is injected into the gap between the substrates 20 and 60. Since ferroelectric liquid crystal has superior properties, such as high-speed response and bistability, this arrangement makes it possible to achieve a liquid crystal display element that allows for high-resolution display and also to overcome the inherent disadvantage of the ferroelectric liquid crystal, that is, susceptibility to external pressure, because the substrate strength has been improved by the spacers 27 that have been formed with fine pitches. Consequently, it becomes possible to provide a passive-matrix-type liquid crystal display element which can achieve superior shock resistance as well as high resolution display.

[Embodiment 2]

Referring to FIGS. 7(a) through 7(d), the following description will discuss another embodiment of the present invention. Here, those members that have the same functions and that are described in the aforementioned Embodiment 1 are indicated by the same reference numerals and the detailed description thereof is omitted.

The liquid crystal display element of the present embodiment is manufactured through the following processes: First, electrodes and light-shielding films are formed on an insulating substrate by any of Methods 1 through 4 that were explained in the aforementioned Embodiment 1. Here, the following example will discuss a case in which the substrate 20, manufactured by Method 2, is adopted. In the aforementioned Embodiment 1, a photosensitive organic resin is used as the material of the spacers. In contrast, the following description will discuss a method for forming spacers by using an organic resin that has no photosensitivity.

Figure 7A:
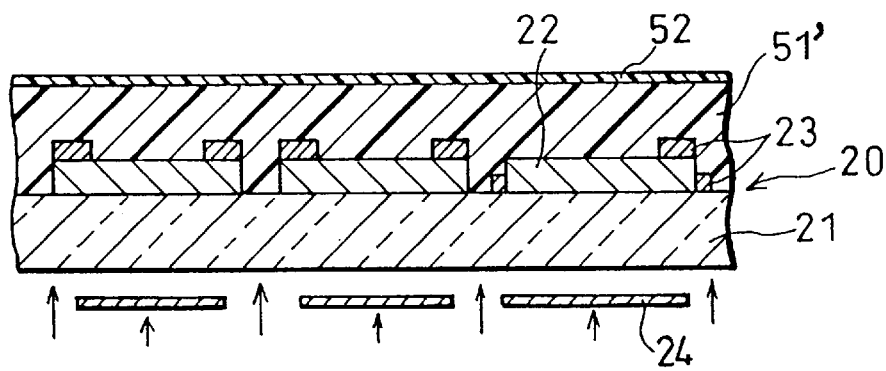
FIGS. 7(a) through 7(d) are cross-sectional views that show a schematic construction of a liquid crystal display element in accordance with another embodiment of the present invention and that are arranged in order of main manufacturing processes.

First, as illustrated in FIG. 7(a), an organic resin 51' having no photosensitivity and a negative-working photoresist 52 are applied onto the surface of the substrate 20 that has been manufactured by Method 2 in this order by the spin coating method, screen printing method, roll coating method or other method, and these are set under predetermined setting conditions. Then, a photomask 24 is positioned on the rear-surface side of the insulating substrate 21 and light is applied thereto.

Figure 7B:
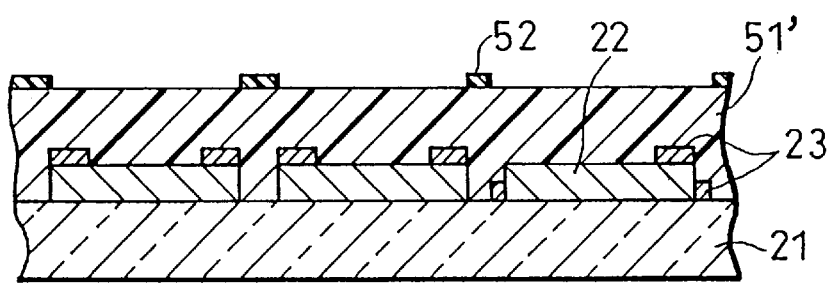
Figure 7C:
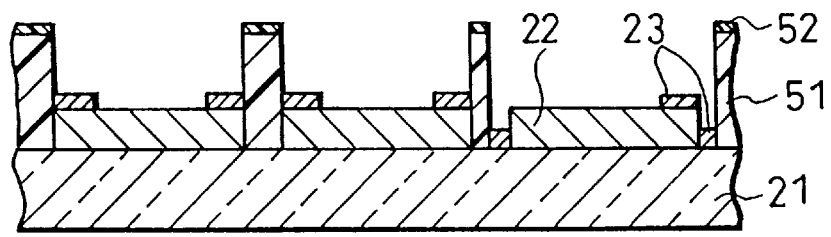
Figure 7D:
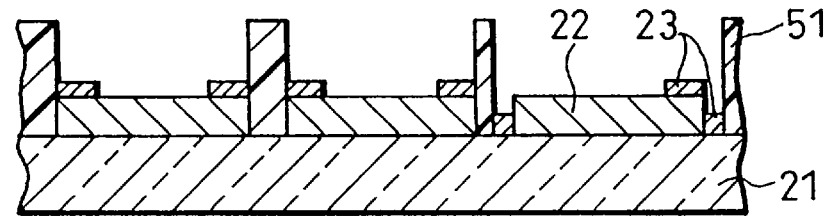
Figure 9A:
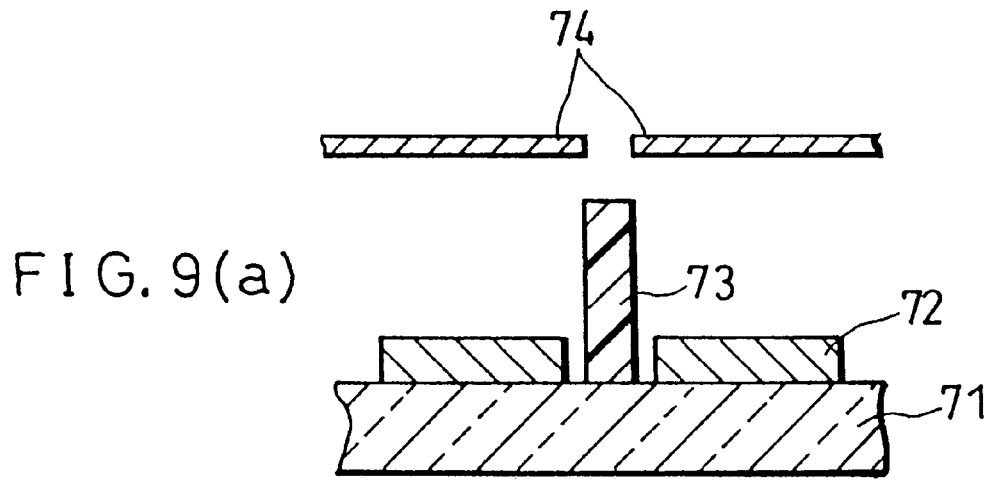
FIGS. 9(a) through 9(c) are cross-sectional views each of which shows an example of the location and shape of a spacer that is formed on an insulating substrate in the case when the mask precision of a photomask used in the photolithography process is improper or the positioning precision of the photomask is improper, during a manufacturing process of a conventional liquid crystal display element.
Figure 9B:
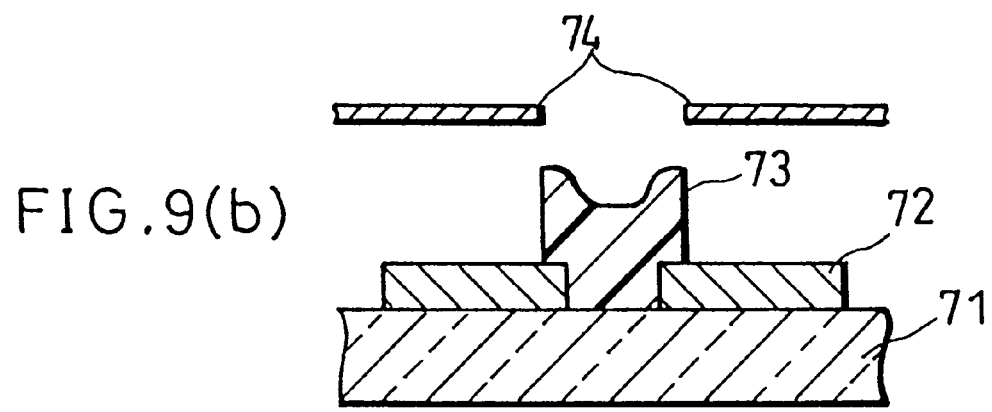
Figure 9C:
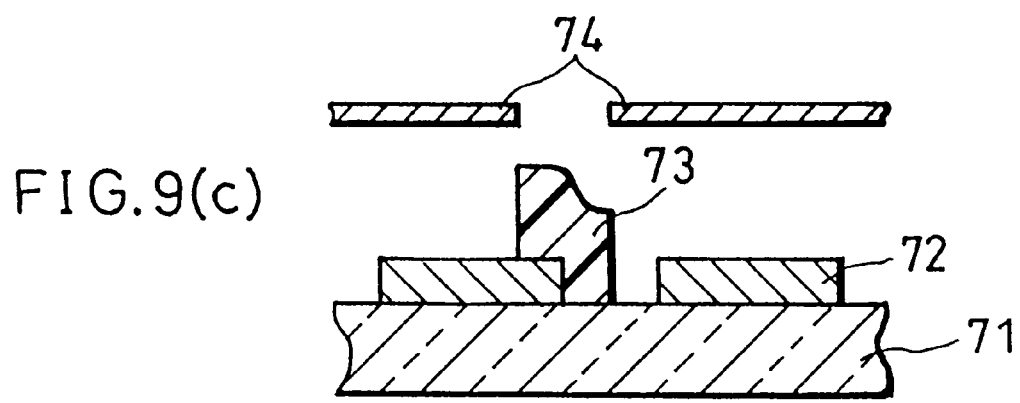
Figure 10A:
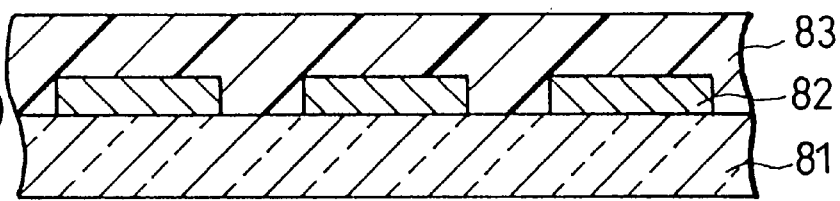
FIGS. 10(a) and 10(b) are cross-sectional views that indicate manufacturing processes for forming spacers in a state where they are self-aligned with respect to electrodes on the insulating substrate in the conventional liquid crystal display element.
Figure 10B:
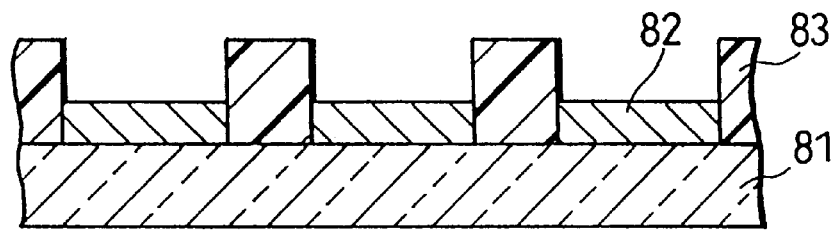

Next, as illustrated in FIG. 7(b), non-irradiated portions of the photoresist 52 are removed by etching. Successively, as illustrated in FIG. 7(c), the organic resin 51' is etched by using the remaining photoresist 52 as a mask, and then the photoresist 52 is removed therefrom; thus, as illustrated in FIG. 7(d), spacers 51 are formed in their self-aligned state with respect to portions of the insulating substrate 21 where neither the electrodes 22 nor the light-shielding film 23 is formed. Here, polyimide resin, non-photosensitive acryl resin or other material is used as the organic resin 51'.

Thereafter, an opposing substrate, not shown, is formed on the spacer 51 so that a liquid crystal display element is complete. Additionally, the opposing substrate may be formed in a state shown in FIG. 7(c), that is, in a state in which the photoresist 52 still remains on the spacers 51.

The spacers 51 that have been formed in this manner are formed in their self-aligned state with respect to the light-shielding films 23 in the same manner as the spacers 27 in the aforementioned Embodiment 1; therefore, display non-uniformity that is caused by disturbance in the orientation of the liquid crystal and changes in the switching characteristics due to the spacers 51 are covered by the light-shielding films 23 so that it is possible to prevent the liquid crystal display element from degradation in display quality. Moreover, in the same manner as aforementioned Embodiment 1, since it is only necessary for the photomask 24 to have light-shielding sections for covering at least portions of the electrodes 22 that have not shielded from light by the light-shielding films 23, more room is provided in the mask precision and the positioning precision. In particular, even in the case of electrodes 22 with fine pitches, it becomes possible to make the manufacturing process of the spacers 51 easier.

[EMBODIMENT 3]

Referring to FIG. 8, the following description will discuss another embodiment of the present invention. Here, those members that have the same functions and that are described in the aforementioned Embodiments are indicated by the same reference numerals and the detailed description thereof is omitted.

The liquid crystal display element of the present embodiment is provided with a substrate which has electrodes and light-shielding films that have been manufactured by any of Methods 1 through 4 that were explained in the aforementioned Embodiment 1. Here, the following example will discuss a case in which the substrate 20, manufactured by Method 2, is adopted.

First, an insulating film 28 and an alignment film 29 are formed on a substrate 20 by the method explained in the aforementioned Embodiment 1 without forming spacers. Next, a substrate 60 is bonded to the substrate 20 face to face with each other.

Then, as illustrated in FIG. 8(a), a mixture consisting of a liquid crystal mixture 66 and precursors 67 of photopolymerizable resin is injected into the gap between the substrates 20 and 60 that have been bonded through a sealing agent 64, and a photomask 24 is positioned on the back-surface side of the substrate 20, and then light is applied thereto.

Consequently, as illustrated in FIGS. 8(b) and 8(c), the precursors 67 of photopolymerizable resin are gradually polymerized at its portions irradiated with light so that they push liquid crystal molecules that have coexist in these portions toward other portions that have been irradiated by light with less intensities; thus, the rate of resin to the liquid crystal composition becomes extremely high in the portions irradiated with light, whereas the rate of resin to the liquid crystal composition, in contrast, becomes extremely low in the other portions that have not irradiated with light. With this arrangement, as illustrated in FIG. 8(d), wall-shaped spacers 67', made of the photopolymerizable resin, are formed in their self-aligned state with respect to the electrodes 22 and the light-shielding films 23 on the substrate 20 so that the substrates 20 and 60 are joined each other.

As described above, the liquid crystal display element of the above-mentioned Embodiment 3 is manufactured by a method having the steps of: bonding the paired substrates 20 and 60; injecting a mixture consisting of the liquid crystal mixture 66 and the precursors 67 of photopolymerizable resin into the gap between the substrates 20 and 60; and applying light thereto from the back-surface side of the substrate 20 using the photomask 24 so as to selectively polymerize the precursors 67 of photopolymerizable resin so that the spacers 67' are formed.

Here, the photomask 24 is formed into any shape as long as at least either the photomask 24 or the light-shielding films 23 cover a region except for the portions at which the spacers 67' are to be formed, that is, the portions at which neither the electrodes 22 nor the light-shielding films 23 is formed. With this arrangement, spacers 67' are formed in a state where they are self-aligned with respect to the light-shielding films 23 between the electrodes 22 by photopolymerizing the precursors 67 of photopolymerizable resin at the above-mentioned portions.

Moreover, in the above-mentioned method, the spacers 67' are formed after the liquid crystal has been injected between the substrates 20 and 60. Therefore, the pattern of the spacers need not be limited by the need for taking the injecting efficiency of liquid crystal into consideration, and for example, it is possible to form spacers into a pattern so as to completely surround the peripheral areas of the pixels. In other words, since the spacer pattern is freely selected so as to further increase the strength of the liquid crystal display element, it is possible to provide a liquid crystal display element which has further improved shock resistance.

Photosetting resin monomers, such as acrylic acids and acrylic esters containing alkyl groups each of which has not less than three carbon atoms or aromatic rings, are used as the precursors 67 of photopolymerizable resin. Moreover, in order to increase the physical strength of the resin, multi-functional resins having not less than two functionalities, such as bisphenol-A-dimethacrylate, may be adopted. Furthermore, halogenides of the above-mentioned photosetting resin monomers, especially fluorides and chlorides of those resins, may be adopted as the material. For example, 2,2,3,4,4,4-hexafluorobutylmethacrelate is listed as such a material. Moreover, the above-mentioned materials may be used individually or two or more kinds of these materials may be used in a mixed manner. The above-mentioned monomers may be used by mixing them with a chloride or fluoride of a monomer or an oligomer, or may be used by mixing them with a photopolymerizable initiator, if necessary.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A manufacturing method of a liquid crystal display element comprising the steps of:

forming a plurality of electrodes having a light-transmitting property on one surface of an insulating substrate in a striped pattern;

forming light-shielding films located at an edge of each electrode along their length, or forming a portion of each light-shielding film extending over each edge of the electrodes along their length; and forming spacers in between the plurality of electrodes, wherein the step of forming the spacers comprises the steps of:

forming an organic resin film having a light-transmitting property and a non-photosensitive property on the surface of the insulating substrate on which the light-shielding films have been formed;

forming a negative-working photoresist film on the organic resin film;

placing on the other surface side of the insulating substrate a light-regulating means for shielding from light at least portions of the electrodes that have not been shielded from light by the light-shielding films, as well as exposing the photoresist film so that its portions, from which neither the light-regulating means nor the light-shielding films have shielded light, are exposed; and removing non-exposed portions of the photoresist film together with the organic resin film located beneath the non-exposed portions whereby the remaining organic resin film forms the spacers.

2. The manufacturing method of a liquid crystal display element as defined in claim 1, further comprising the step of: bonding an opposing substrate to the side of the insulating substrate on which the spacers have been formed, and then injecting ferroelectric liquid crystal into a gap between these substrates.

3. The manufacturing method of a liquid crystal display element as defined in claim 1, wherein a polyimide resin is used for the organic resin.

4. The manufacturing method of a liquid crystal display element as defined in claim 1, wherein an acryl resin is used for the organic resin.

5. A liquid crystal display element, which has been manufactured by the manufacturing method of a liquid crystal display element as defined in claim 1, comprising:

ferroelectric liquid crystal that is injected between the insulating substrate and an opposing substrate that has been bonded thereto so as to face the side of the insulating substrate bearing the spacers formed thereon.

6. The manufacturing method of a liquid crystal display element as defined in claim 3, wherein the step of forming the spacers comprises the steps of:

placing an opposing substrate so as to face one surface of the insulating substrate on which the electrodes and the light-shielding films have been formed, and then injecting a mixture containing at least a precursor of photopolymerizable resin and a liquid crystal mixture in a gap between the insulating substrate and the opposing substrate; and placing a light-regulating means on the other surface side of the insulating substrate, and then applying light thereto so that the precursor of photopolymerizable resin is photopolymerized at its portions from which neither the light-regulating means nor the light-shielding films have shielded light, thereby forming spacers.

7. A liquid crystal display element, which has been manufactured by the manufacturing method of a liquid crystal display element as defined in claim 6, wherein the precursor of photopolymerizable resin is selected from the group consisting of:

an acrylic acid containing an alkyl group which has not less than three carbon atoms, an acrylic ester containing an alkyl group which has not less than three carbon atoms, an acrylic acid containing aromatic rings and an acrylic ester containing aromatic rings.

8. The liquid crystal display element as described in claim 7, wherein the precursor of photopolymerizable resin is a halogenide.

9. A liquid crystal display element, which has been manufactured by the manufacturing method of a liquid crystal display element as defined in claim 6, wherein the precursor of photopolymerizable resin comprises at least two functional groups.

10. A liquid crystal display element, which has been manufactured by the manufacturing method of a liquid crystal display element as defined in claim 6, wherein the liquid crystal comprises ferroelectric liquid crystal.

11. A manufacturing method of a liquid crystal display element comprising the steps of:

forming a plurality of electrodes having a light-transmitting property on one surface of an insulating substrate in a striped pattern;

forming light-shielding films so as to include at least a portion extending over each edge of the electrodes along their length; and forming spacers in between the plurality of electrodes using light irradiation in a manner which the light-shielding films alone function to shield light radiation from at least a part of a region in which spacers are not to be formed.

12. A liquid crystal display element formed in accordance with the method of claim 11.

13. The liquid crystal display element as defined in claim 12, wherein the spacer is formed with a wall shape along one of the long sides of the electrodes.

14. The liquid crystal display element as defined in claim 12, wherein the ferroelectric liquid crystal is further included between the insulating substrate and an opposing substrate.

15. A manufacturing method of a liquid crystal display element comprising the steps of:

forming a plurality of electrodes having a light transmitting property on one surface of an insulating substrate having a light-transmitting property in a striped pattern, as well as forming light-shielding films so that the light-shielding films are formed at least adjacent to the edge of each electrode along one of the long sides thereof;

providing a light-regulating means for shielding light in operative combination with the light-shielding films to define areas in which spacers are to be formed, the light-shielding films being used in such a manner that the light-shielding films function in the absence of the light-regulating means to shield light radiation from at least a part of a region in which spacers are not to be formed; and exposing the areas to light in order to form the spacers.

* * * * *